May 8, 1951     A. E. SCHUBERT ET AL     2,552,220
AUTOMATIC SHUTDOWN ARRANGEMENT FOR DOCUMENT COPYING APPARATUS
Filed May 13, 1948     2 Sheets-Sheet 1
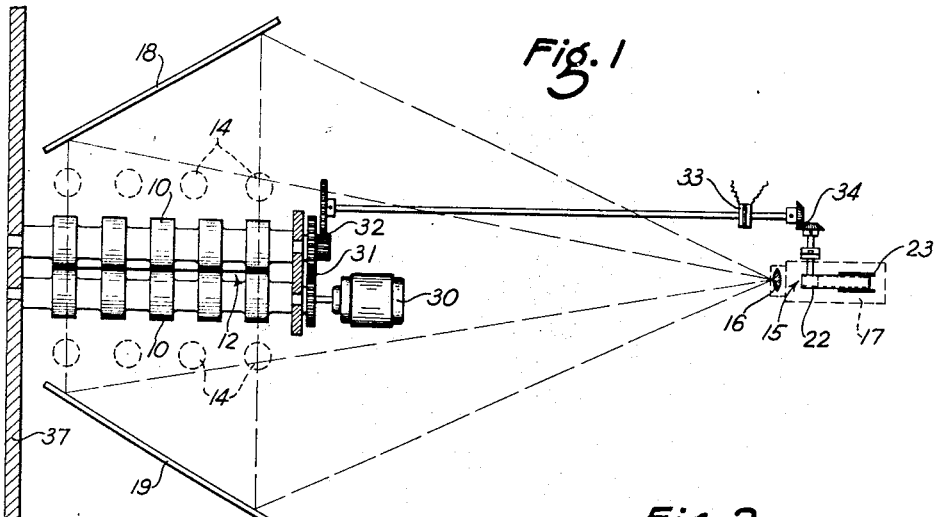
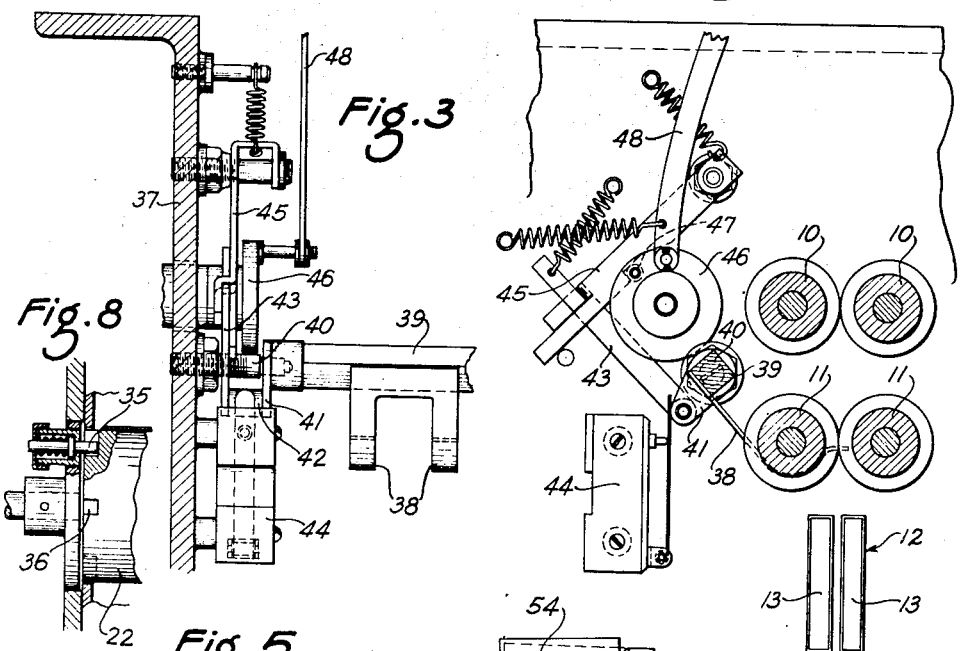
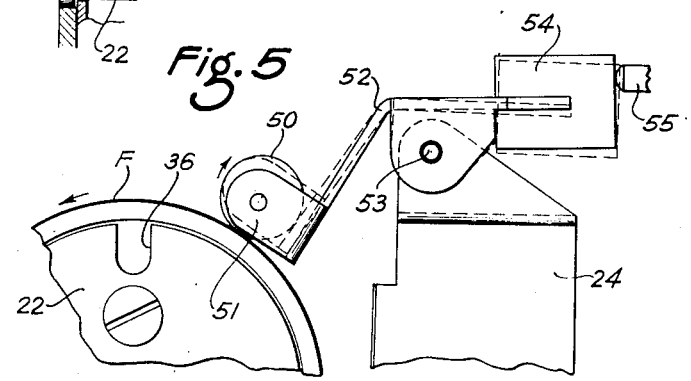
ALVIN E. SCHUBERT
HARVEY P. HINTZ
JOHN F. EGAN
INVENTORS
BY
ATTORNEYS May 8, 1951  A. E. SCHUBERT ET AL  2,552,220
AUTOMATIC SHUTDOWN ARRANGEMENT FOR DOCUMENT COPYING APPARATUS
Filed May 13, 1948  2 Sheets-Sheet 2
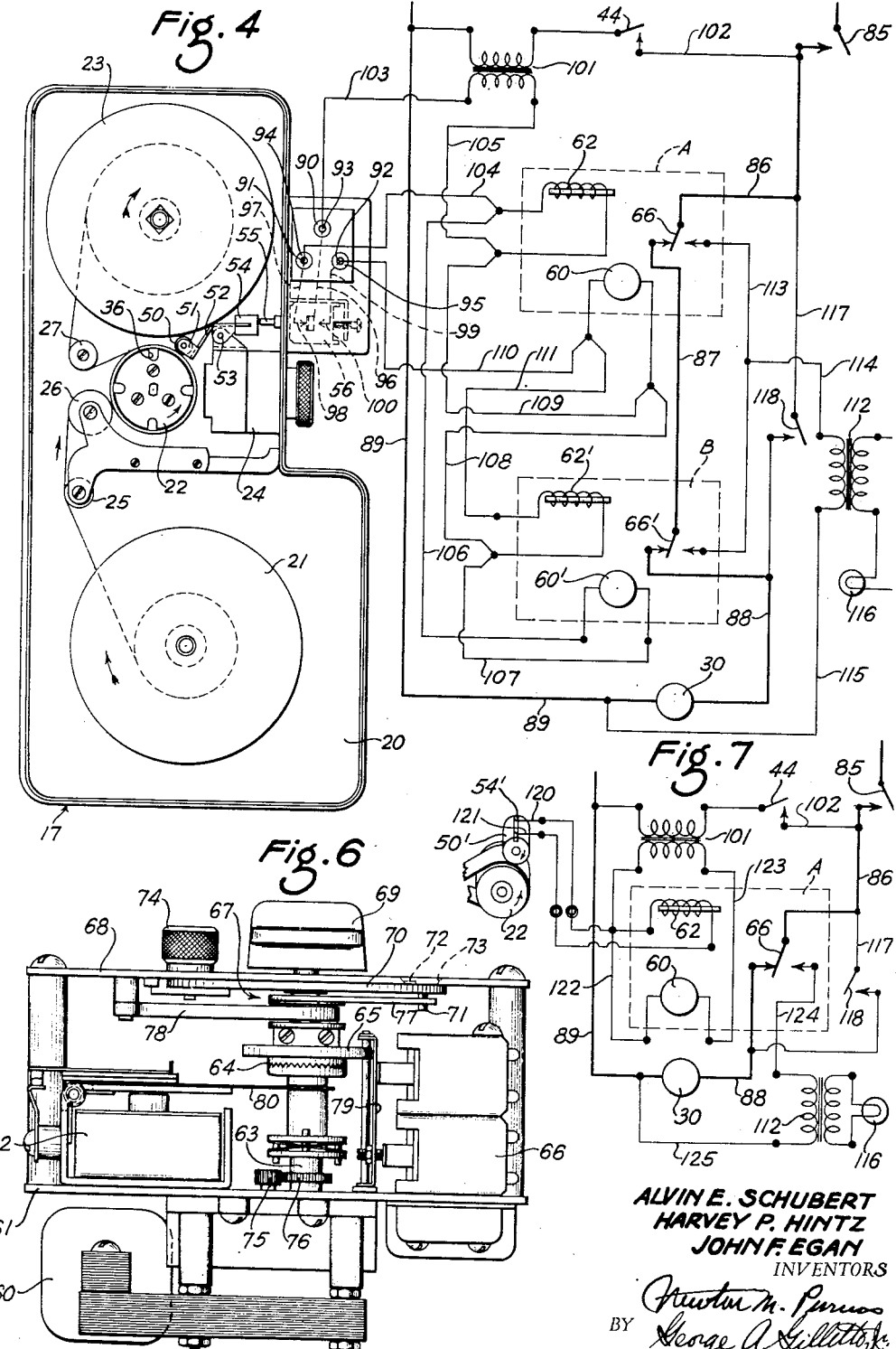
ALVIN E. SCHUBERT
HARVEY P. HINTZ
JOHN F. EGAN
INVENTORS
BY
ATTORNEYS Patented May 8, 1951

2,552,220

UNITED STATES PATENT OFFICE 2,552,220

AUTOMATIC SHUTDOWN ARRANGEMENT FOR DOCUMENT COPYING APPARATUS

Alvin E. Schubert, Harvey P. Hintz, and John F. Egan, Rochester, N. Y., assignors to Eastman Kodak Company, Rochester, N. Y., a corporation of New Jersey Application May 13, 1948, Serial No. 26,868

12 Claims. (Cl. 88—24)

This invention relates to film handling apparatus and more particularly to an apparatus for photographically copying documents in which a timing or control means stops said apparatus after a predetermined interval of time upon failure of the film advancing means to move the film.

In document copying apparatus, the film handling unit containing the film to be exposed is usually mounted or held upon a hanger in proper relation to the document moving past the photographing station. Since the film handling unit must be readily removable for loading said unit with film and for removing the exposed film, a drive pin or clutch member is operatively connected to the drive means for the document so that when said unit is positioned on the hanger, the mating part for the drive pin or clutch will engage therewith to move the film within said unit in synchronism with the moving document. However, in loading the film handling unit with film, the film may be threaded in such a manner, through carelessness on the part of the operator, that the film will not advance or be moved when said unit is placed on the hanger and the drive for the film is energized by the documents which are fed into the machine. If this happens, the operator has no way of knowing that the film is not being advanced and a great many documents may be fed into the machine without being photographed. It is also possible that the operator may have positioned the film handling unit properly on the hanger but did not lock said unit in position so that the drive pin or clutch member is not in proper engagement with said unit for advancing the film. In this case, documents may again be fed into the machine without being photographed because of non-movement of the film. Further, if there should occur some failure in the drive for the drive pin such as failure of the electro-magnetic clutch, or if during the course of feeding documents the drive pin should shear, the operator will again be feeding documents into the machine which are not being photographed because of non-movement of the film.

These difficulties are eliminated and overcome in the present invention by providing for automatic shutdown of the apparatus after a predetermined interval of non-movement of the film. By providing a member which is responsive to film movement, a timing means is energized for a predetermined interval, and if the film fails to move, the timing means runs for said predetermined interval and at the end of said interval the apparatus is shut down. The time interval is of relatively short duration, such as five seconds, so that when relatively short documents such as checks are being fed into the machine, at best only ten or fifteen checks may be fed into the machine before it is automatically shut off. Upon correction of the condition causing the shut down, the operator then can re-feed the last ten to fifteen checks and be sure that each one has been photographed. Without this shutdown control rendered operative by non-movement of the film, the operator would have no way of telling at what point in the course of feeding several hundreds of checks the break-down actually occurred.

The primary object of the invention, therefore, is to provide a film handling apparatus with an automatic shut-down arrangement which is responsive to non-movement of the film.

Another object of the invention is to provide a film handling apparatus with a member responsive to film movement and having a part moving periodically to a predetermined position for re-setting a timing means which is operative to stop said apparatus after a time interval greater than the period of movement of said part.

And still another object of the invention is to provide a film handling apparatus with a timing means which is rendered operative by a switch means in its closed position for stopping said apparatus after a time interval greater than the period of movement of a part movable periodically to a predetermined position by a member responsive to film movement, said part resetting said timing means when in said predetermined position.

Yet another object of the invention is to provide a document copying machine with a member responsive to film movement and having a part movable periodically between positions and two timing means adapted to be alternately rendered operative for stopping said apparatus after a time interval greater than one-half of the period of said part and alternately re-set by movement of said part from one of said positions to the other position.

And yet another object of the invention is to provide a document copying machine with a monitoring arrangement which is responsive to non-movement of the film and which is rendered operative only during the period in which the document is being photographed.

Other objects and advantages of the invention will be apparent to those skilled in the art by the description which follows.

The above-mentioned and other objects of the invention are embodied in an apparatus for photographically copying documents comprising a photographing station, an exposure station, a document advancing means for moving said document past said photographing station, an advancing means responsive to said moving document for moving a film past said exposure station in synchronism with the movement of said document, a switch means adapted to be moved to a closed position by said moving document, an eccentric roller adapted to be rotated by film movement and having a part connected thereto for moving periodically between two positions, a timing means responsive to said switch means in said closed position and to said part in one of said positions for stopping said apparatus after a time interval greater than one-half the period of said part, a second timing means responsive to said switch means in said closed position and to said part in said other position for stopping said apparatus after a time interval greater than one-half the period of said part, a double pole switch including a contact member movable by said part between the poles of said switch for alternately energizing said first-mentioned timing means and resetting said second timing means in one position of said part, and energizing said second timing means and re-setting said first-mentioned timing means in the other position of said part, and means operative by said timing means at the end of said interval for indicating stoppage of said apparatus.

While the invention will be described as embodied in an apparatus for photographically copying documents, it is to be understood that said invention may be incorporated in various types of film handling apparatus. It is also conceivable that said invention may be applied to an apparatus in which the film is moved intermittently as in a movie camera. Thus, the present invention is not to be limited by the illustrated embodiment thereof but has a scope as broad as the interpretation of the claims permit.

Reference is now made to the accompanying drawings wherein similar reference characters designate similar parts and wherein:

Fig. 1 is a diagrammatic plan view showing the arrangement and relation of the various parts of a document copying machine which photographs both sides of the document simultaneously;

Fig. 2 is a partial side view of the document feed rollers and the document-actuated switch;

Fig. 3 is a partial rear elevation of the parts shown in Fig. 2;

Fig. 4 is a diagrammatic view of one side of the film handling unit and shows the electrical circuit for connecting two timers which are adapted to be alternately energized by an eccentric roller engaging the film;

Fig. 5 is a detailed view of the arrangement for mounting the eccentric roller and shows the roller and the part connected thereto in both of the extreme positions, one of said positions being indicated by dotted lines;

Fig. 6 is a side elevation of the timer used in the present invention;

Fig. 7 is a wiring diagram showing another embodiment of the invention in which a single timer is used with an insulating roller having a contact strip; and Fig. 8 is a partial section showing how the film drive roller is connected to the drive pin on the film advancing means.

In the illustrated embodiment of the document copying apparatus in which the invention is incorporated, the document is fed into a feeding station and advanced by the rollers 10 and 11 into the photographing station, designated broadly by the numberal 12. The photographing station comprises two glass strips 13 between which the document is moved by the rollers 10 and 11 and picked up by a second set of similar rollers, not shown, immediately below said strips. A mask may be positioned adjacent said glass strips to provide the necessary photographing aperture and said aperture is illuminated on each side by the lamps 14 in a known manner. The exposure station, designated by the numeral 15 in Fig. 1, is the focal plane of the objective or lens 16 in the film handling unit 17. The image of one side of the document is reflected to the lens 17 by the mirror 18, and the image of the other side of the document is reflected to the lens 17 by the mirror 19, said images appearing in side by side relationship on the exposed and developed film.

The film handling unit 17, see Fig. 4, comprises a casing 20, a supply reel 21, a film drive roller 22 and a take-up reel 23. The objective or lens 17 is mounted in the lens block 24, and the film is moved by the roller 22 through the focal plane of said lens. The film is threaded from the supply reel 21 over the rollers 25 and 26, around the drive roller 22, around the roller 27, and to the take-up reel 23. This film handling unit is of the same type disclosed in U. S. Patent 2,033,713 issued to C. J. Hughey on March 10, 1936.

The document advancing means comprises a motor 30 which is operatively connected to the rollers 10 and 11 through a gear train 31 or by a suitable belt and pulley arrangement as disclosed in the U. S. patent application, Serial No. 707,946, filed November 5, 1946 in the names of John F. Egan and George S. Jones. The motor 30 drives the rollers 10 and 11 continuously, and the film advancing drive is operatively connected to the gear train 31 by the gear train 32. The film advancing drive includes the electro-magnetic clutch 33 and the mitre gears 34 which drive the drive pin 35, see Fig. 8. The drive pin 35 is adapted to engage one of the recesses 36 in the drive roller 22. The film advancing means, therefore, comprises the film advancing drive, the clutch 33, the drive pin 35, the drive roller 22 and other parts associated therewith.

As a document is moved by the rollers 10 into the bite of the rollers 11, the leading edge of the document strikes the fingers 38, which protrude into the document path, and rotates said fingers in a clockwise direction, see Fig. 2. The fingers 38 are secured to the rod 39 which extends across the machine and is pivotally mounted on the studs 40 in the support member 37, only one side of which is shown in Fig. 3. The rod 39 carries an arm 41 at one end thereof which is connected by the sleeve 42 to the lever 43. As the fingers 38 are rotated in a clockwise direction, the rod 39 and the sleeve 42 are rotated therewith to actuate the switch 44 to a closed position for energizing the timing circuit to be described more fully hereinafter. A similar switch, or switches, is operated by the movement of the fingers 38 to energize the lamps 14 and the clutch 33. The levers 43 and 45, together with the disc 46 and the pin 47 comprises a one-revolution stop arrangement and together with the link 48 for operating a counter does not form a part of the present invention.

The means responsive to film movement, see Fig. 5, comprises a roller 50 which is mounted eccentrically between the ears 51 formed up from the lever 52 which is pivotally mounted on the lens block 24 at 53. The lever 52 has fixed thereto a part 54 which is adapted to actuate the plunger 55 of the double-pole switch 56 for moving the contact member thereof periodically between the poles of said switch for a purpose to be described hereinafter.

The timing means, see Fig. 6, is a commercial type of timer which includes a synchronous motor 60 mounted on the underside of the plate 61, a solenoid 62, drive shaft 63, clutch 64, cam 65, switch 66, and the setting mechanism 67 mounted between the plate 61 and the plate 68. By turning the knob 69, the plate 70 is turned therewith together with the pin 71 to bring the time interval desired, which is engraved on the top surface of the plate 70, in line with the index 72 in the aperture 73 in the plate 68, and said plate is locked in position by the knob 74. When the motor 60 is energized, the shaft 63 will be driven through the gears 75 and 76, and the arm 77 will be rotated against the action of the coiled leaf spring 78 through the clutch 64 from a zero position toward a predetermined position determined by the pin 71. At the same time, the cam 65 is rotated to strike the switch actuating bar 79 to close switch 66 at the same time the arm 77 contacts the pin 71. The solenoid 62 upon energization releases the clutch 64 by means of the arm 80, and the spring 78 then returns the arm 77 and the cam 65 to the zero position. While the timing means per se, as described hereinbefore, forms a part of the invention only in combination with other elements, it is to be understood that various other types of commercial timers may be used without departing from the invention as defined by the claims.

The operation of the timing means in conjunction with the other elements of the invention will now be described. In one of the embodiments of the invention, as disclosed in Fig. 4, it will be noted that only the electrical elements of the timing means are shown, and that in this embodiment two timers are used which are identical in construction but which will be designated as timer A and timer B.

The motor 30 is continuously energized with the closing of the switch 85 in the line 86 connected to the contact member of the switch 66 of timer A, the line 87 which connects one pole of the switch 66 with the contact member of the switch 66' of timer B, the line 88 which connects one pole of the switch 66' with one side of the motor 30, and the line 89 which connects the other side of the motor 30 with the source of potential. The film handling unit 17 is provided with three contacts 90, 91 and 92 which engage a similar set of contacts 93, 94 and 95 on the hanger when said unit is properly positioned. The contact member 90 is connected by the line 96 to the movable contact of switch 56, the contact 91 is connected by the line 97 to the pole 99 of switch 56, and the contact 92 is connected by the line 98 to the pole 100 of switch 56. With the entry of a document between the rollers 10 and 11, the fingers 38 close the switch 44 to energize the transformer 101 which is connected by the line 102 across the lines 86 and 89. The current flow is then from the transformer 101 to the line 103, the contacts 90 and 93, the movable contact of switch 56 to the pole 98 and the contacts 91 and 94. With the movable contact member of switch 56 in the position shown in Fig. 4, the solenoid 62 is energized to release the clutch 64 of timer A, and the motor 60' of timer B is energized to drive the arm 77 toward the pin 71. The solenoid 62 is energized by the current flow from contacts 91 and 94 through the line 104, the solenoid 62, and through the line 105 to the other side of the transformer 101. The motor 60' of the timer B is connected in parallel circuit with solenoid 62, and the current flow is from the contacts 91 and 94 through the line 104, line 106, motor 60', line 107, line 108, line 109, and line 105 to the other side of the transformer 101.

As stated hereinbefore, the other switch or switches closed by movement of the fingers 38 energizes the lamps 14 and the clutch 33. Upon closing of said switch by the movement of the document, the film drive roller 22 is rotated by the pin 35 to move the film in synchronism with the document. As the film moves, the roller 50 is rotated clockwise and the part 54 is oscillated to move the movable contact member of the switch 56 back and forth periodically between the poles 98 and 100 of said switch. If, as shown in Fig. 5, the roller 50 is at its low point with the movable contact member engaging the pole 98, then upon one-half a revolution of the roller 50 by the moving film, the contact member will be moved away from pole 98 and into engagement with the pole 100 for deenergizing the solenoid 62 and the motor 60' and energizing the motor 60 and the solenoid 62'. It is to be understood that the time interval is cumulative, in other words each document or check, depending on the length, causes a certain amount of film to be advanced, and a length of film approximately equal to half the circumference of the roller 50 must be advanced before the movable contact member of switch 54 will be moved from pole 98 to pole 100, or vice versa. In the present disclosure, the roller 50 is of such a size that approximately five normal size checks must be fed through the machine before the movable contact of switch 54 is moved to its other pole. Resetting of each timer, therefore, takes place with approximately every fifth check fed into the machine. With an exceedingly long document, one timer may be reset and time accumulated in the other timer before the document is completely photographed.

The motor 60 is energized by the current flow from the contacts 92 and 95 through line 110, the motor 60, line 109, and line 105 to the other side of the transformer 101. The solenoid 62' of timer B is in parallel circuit with motor 60 and is energized by the current flow from the contacts 92 and 95 through line 110, line 111, solenoid 62', line 108, line 109, and line 105 to the transformer 101. It can be readily appreciated that as the movable contact member of switch 56 is moved back and forth between the poles 98 and 100, the timers A and B are alternately energized and re-set. The time interval for which each timer can be set must of necessity be greater than the time necessary for the roller 50 to make one-half a revolution, or in other words, the interval must be greater than one-half the period of movement of the part 54.

In the event that the film advancing drive fails, the clutch 33 fails, or the pin 35 is sheared, the film will not be advanced and the roller 50 will not be rotated, even though documents may still be fed into the machine. With any of these failures, the contact member of switch 56 will remain in contact with one of the poles and the motor energized will continue to run until the cam 65 rocks the bar 79 to move the contact member of switch 66 into engagement with the other pole thereof to break the circuit to the motor 30 and shut down the entire machine. When this occurs, the transformer 112 is energized by line 113 and line 114, depending on which timer motor is being energized, and line 115 connecting the other side of said transformer to the line 89. With the energization of said transformer, the pilot lamp 116 is energized to warn the operator of non-movement of the film. The line 86 is connected with the line 88 by the line 117 and hold-down switch 118 for temporarily energizing motor 30 for moving out of the machine any document caught therein upon the shut down. The switch 118 must also be held closed upon correction of the machine failure until the switch 66 is released by the cam 65 to permit the movable contact of said switch to move into engagement with its proper pole.

In Fig. 7 another embodiment of the invention is shown in which only the timer A is used. An insulating concentric roller 50' is mounted for engaging the film on the drive roller 22 and adapted to be rotated thereby and has a contact strip 54' which is adapted to close the circuit across the contact members 120 and 121 upon each revolution of said roller. The motor 30 is continuously energized by the current flow upon closing of switch 85 through the line 86, switch 66 of timer A, line 88, motor 30, and line 89. With the closing of switch 44 by the document, the transformer 101 is energized and at the same time the motor 60 is energized by the lines 122 and 123. The solenoid 62 is momentarily energized upon each revolution of the strip 54' to permit the spring 78 to re-set the timer to the zero position. If the film fails to move for any of the reasons stated above, the motor 60 will be energized until the cam 65 moves the contact member of switch 66 into engagement with the other pole of said switch to cut out the motor 30 and energize the transformer 112 for energizing the lamp 116. The transformer is connected to a pole of switch 66 by the line 124 and to line 89 by the line 125. This arrangement is also provided with a holding switch 118 in the line 117 which connects the line 86 to the line 88 around the switch 66 upon closure thereof. It will be noted that in this arrangement in which a single timer is used, that the time interval must be greater than the period of movement of the contact strip 54', or in other words, the time interval must be greater than the time required for the roller 54' to make one complete revolution.

In either of the arrangements disclosed and described above, the timing means operates to shut down the apparatus after a predetermnied time interval provided there is no movement of the film. It has been found that in the arrangement using alternately energized timers that a time interval of five (5) seconds provides a satisfactory operating interval. Other advantages of the automatic shut down for film handling apparatus disclosed herein will be obvious to those skilled in the art and various modifications thereof may become apparent to obtain the same advantages. However, the present disclosure is to be construed only in an illustrative sense, and the scope of the invention is defined in the claims which follow.

Having now particularly described our invention, what we desire to secure by Letters Patent of the United States and what we claim is:

1. In a film handling apparatus, the combination with a prime mover, and an advancing means operatively connected to said prime mover for moving a film strip, of an intermediate means responsive to film movement and having a part moving periodically to a predetermined position, and a timing means operative independently of movement of said part to measure a time interval greater than the period of movement of said part, re-set by film movement and movement of said part to said position, and operative to stop said prime mover at the end of said time interval upon cessation of film movement and movement of said part.

2. In a film handling apparatus, the combination with a prime mover, and an advancing means operatively connected to said prime mover for moving a film strip, of an intermediate means responsive to film movement and having a part moving periodically to a predetermined position, a timing means operative independently of movement of said part to measure a time interval greater than the period of movement of said part, re-set by film movement and movement of said part to said position, and operative to stop said prime mover at the end of said time interval upon cessation of film movement and movement of said part, and means operative by said timing means at the end of said interval for indicating stoppage of said prime mover.

3. In a film handling apparatus, the combination with a prime mover, and an advancing means operatively connected to said prime mover for moving a film strip, of a rotatable insulating member responsive to film movement and having a contact strip thereon, a pair of fixed contact members adapted to periodically engage said contact strip, an electrical timing means operative independently of movement of said contact strip to measure a time interval greater than the time required for said member to make one complete revolution, re-set by film movement and movement of said contact strip into engagement with said contact members, and operative to stop said prime mover at the end of said time interval upon cessation of film movement and movement of said member, and means operative by said timing means at the end of said interval for indicating stoppage of said prime mover.

4. In a film handling apparatus, the combination with a prime mover, and an advancing means operatively connected to said prime mover for moving a film strip, of an intermediate means responsive to film movement and having a part thereof moving periodically between two positions, and a timing means operative independently of movement of said part to measure a time interval greater than the period of movement of said part, re-set by film movement and movement of said part to its other position, and operative to stop said prime mover at the end of said time interval upon cessation of film movement and movement of said part.

5. In a film handling apparatus, the combination with a prime mover, and an advancing means operatively connected to said prime mover for moving a film strip, of an intermediate means responsive to film movement and having a part moving periodically between two positions, a timing means operative independently of movement of said part to measure a time interval greater than the period of movement of said part, re-set by film movement and movement of said part to its other position, and operative to stop said prime mover at the end of said time interval upon cessation of film movement and movement of said part, and means operative by said timing means at the end of said interval for indicating stoppage of said prime mover.

6. In an apparatus for photographically copying documents, the combination with a photographing station, an exposure station, a document advancing means for moving said document past said photographing station, and an advancing means operatively connected to said document advancing means and responsive to said moving document for moving a film strip past said exposure station, of a switch means adapted to be actuated to a closed position by said moving document, an intermediate means responsive to film movement and having a part thereof moving periodically between two positions, a timing means responsive to said switch means in said closed position and operative independently of movement of said part to one of said positions to measure a time interval greater than the period of movement of said part, re-set by film movement and movement of said part to its other position, and operative to stop said document advancing means at the end of said time interval upon cessation of film movement and movement of said part, and means operative by said timing means at the end of said interval for indicating stoppage of said document advancing means.

7. In an apparatus for photographically copying documents, the combination with a photographing station, an exposure station, a document advancing means for moving said document past said photographing station, and an advancing means responsive to said moving document for moving a film past said exposure station, of an intermediate means responsive to film movement and having a part thereof moving periodically between two positions, a timing means responsive to movement of said part to one of said positions and operative independently of movement of said part to measure a time interval greater than the period of movement of said part, re-set by film movement and movement of said part to its other position, and operative to stop said document advancing means at the end of said time interval upon cessation of film movement and movement of said part, and means operative by said timing means at the end of said interval for indicating stoppage of said apparatus.

8. In an apparatus for photographically copying documents, the combination with a photographing station, an exposure station, a document advancing means for moving said document past said photographing station, and an advancing means for moving a film past said exposure station, of a switch means adapted to be moved to a closed position by said moving document, an intermediate means responsive to film movement and having a part moving periodically between two positions, a timing means responsive to said switch means in said closed position and to said part in one of said positions, and a second timing means responsive to said switch means in said closed position and to said part in said other position, each of said timing means being operative to stop said apparatus after a time interval greater than one-half the period of movement of said part and re-set by movement of said part from one position to said other position to initiate another time interval.

9. In an apparatus for photographically copying documents, the combination with a photographing station, an exposure station, a document advancing means for moving said document past said photographing station, and an advancing means for moving a film past said exposure station, of a switch means adapted to be moved to a closed position by said moving document, an intermediate means responsive to film movement and having a part moving periodically between two positions, a timing means responsive to said switch means in said closed position and to said part in one of said positions, and a second timing means responsive to said switch means in said closed position and to said part in said other position, each of said timing means being alternately rendered operative to stop said apparatus after a time interval greater than one-half the period of movement of said part and alternately re-set by movement of said part from one position to said other position to initiate another time interval, and means operative by said timing means at the end of said interval for indicating stoppage of said apparatus.

10. In an apparatus for photographically copying documents, the combination with a photographing station, an exposure station, a document advancing means for moving said document past said photographing station, and an advancing means for moving a film past said exposure station, of an intermediate means responsive to film movement and having a part moving periodically between two positions, a timing means adapted to move from a zero position to a predetermined position upon movement of said part to one position for stopping said apparatus after an interval of time greater than one-half the period of said part and re-set to said zero position upon movement of said part to said other position, and a second timing means adapted to move from a zero position to a predetermined position upon movement of said part to said other position for stopping said apparatus after an interval of time greater than one-half the period of said part and re-set to said zero position upon movement of said part to said first position.

11. In an apparatus for photographically copying documents, the combination with a photographing station, an exposure station, a document advancing means for moving said document past said photographing station, and an advancing means for moving a film past said exposure station, of a switch means adapted to be moved to a closed position by said moving document, an intermediate means responsive to film movement and having a part moving periodically between two positions, a timing means responsive to said switch means in said closed position and to said part in one of said positions, and a second timing means responsive to said switch means in said closed position and to said part in said other position, and a double-pole switch including a contact member movable by said part between the poles of said switch for alternately energizing said first-mentioned timing means for stopping said apparatus after a time interval greater than one-half the period of said part and re-setting said second timing means in one position of said part and energizing said second timing means for stopping said apparatus after a time interval greater than one-half the period of said part and re-setting said first-mentioned timing means in the other position of said part.

12. In an apparatus for photographically copying documents, the combination with a photographing station, an exposure station, a document advancing means for moving said document past said photographing station, an advancing means responsive to said moving document for moving a film strip past said exposure station in synchronism with the movement of said document, of a switch means adapted to be moved to a closed position by said moving document, an eccentric roller adapted to be rotated by film movement and having a part connected thereto for moving periodically between two positions, a timing means responsive to said switch means in said closed position and to said part in one of said positions for stopping said apparatus after a time interval greater than one-half the period of said part, a second timing means responsive to said switch means in said closed position and to said part in said other position for stopping said apparatus after a time interval greater than one-half the period of said part, and a double-pole switch including a contact member movable by said part between the poles of said switch for alternately energizing said first-mentioned timing means and re-setting said second timing means in one position of said part, and energizing said second timing means and re-setting said first-mentioned timing means in the other position of said part.

ALVIN E. SCHUBERT.
HARVEY P. HINTZ.
JOHN F. EGAN.

REFERENCES CITED

The following references are of record in the file of this patent:

UNITED STATES PATENTS

| Number | Name | Date |
| --- | --- | --- |
| 1,966,348 | Hughey | July 10, 1934 |
| 2,391,274 | Schubert | Dec. 18, 1945 |